United States Patent [19]

Ferenczy et al.

[11] Patent Number: 5,553,640
[45] Date of Patent: Sep. 10, 1996

[54] STAINLESS STEEL STRIP PLATED WITH BRAZING ALLOY FOR MULTILAYER TUBE MANUFACTURING

[75] Inventors: Nikolaus Ferenczy; Dieter Junkers, both of Haan, Germany

[73] Assignee: Hille & Müller, Düsseldorf, Germany

[21] Appl. No.: 24,155

[22] Filed: Feb. 26, 1993

[30]    Foreign Application Priority Data

Jun. 27, 1992 [DE] Germany ................. 42 21 167.0

[51] Int. Cl.$^6$ ....................................... F16L 9/14
[52] U.S. Cl. ................. 138/154; 138/137; 138/140; 138/142; 138/143; 138/153; 138/DIG. 6
[58] Field of Search ............... 138/137, 140, 138/141, 142, 143, 144, 152, 153, 177, DIG. 6; 228/143, 142, 262.42, 262.6, 262.61

[56]                 References Cited

U.S. PATENT DOCUMENTS

| | | | |
|---|---|---|---|
| Re. 17,631 | 4/1930 | Lytle | 228/262.42 |
| 1,650,321 | 11/1927 | Bundy | 138/142 |
| 1,763,755 | 6/1930 | Bundy | 138/142 |
| 1,909,501 | 5/1933 | Quarnstrom | 228/143 |
| 2,014,982 | 9/1935 | Quarnstrom | 228/143 |
| 2,158,461 | 5/1939 | Koehring et al. | 138/142 |
| 2,210,338 | 8/1940 | Quarnstrom | 138/142 |
| 2,255,472 | 9/1941 | Quarnstrom | 138/142 |
| 3,091,029 | 5/1963 | Davis | 228/262.42 |
| 3,598,156 | 8/1971 | Ulmer et al. | 138/143 |
| 3,625,256 | 12/1971 | Kennedy | 138/142 |
| 3,948,432 | 4/1976 | Pryor et al. | |
| 4,009,027 | 2/1977 | Naidich et al. | 228/262.42 |
| 4,064,914 | 12/1977 | Grant | 138/142 |
| 4,117,968 | 10/1978 | Naidich et al. | 228/262.42 |
| 4,223,826 | 9/1980 | Usui | 228/226.42 |
| 4,432,411 | 2/1984 | Hooper | 138/142 |
| 4,467,016 | 8/1984 | Baldi | 138/143 |
| 4,522,331 | 6/1985 | Liebermann et al. | 228/262.42 |
| 4,630,767 | 12/1986 | Mizuhara | 228/262.42 |
| 4,631,171 | 12/1986 | McDonald | 228/262.42 |
| 4,883,745 | 11/1989 | Mizuhara | 228/262.42 |

FOREIGN PATENT DOCUMENTS

| | | | |
|---|---|---|---|
| 0449600 | 10/1991 | European Pat. Off. | |
| 0546790 | 6/1993 | European Pat. Off. | |
| 663273 | 8/1929 | France | |
| 2399916 | 3/1979 | France | |
| 359731 | 10/1931 | United Kingdom | 228/143 |
| 384154 | 12/1932 | United Kingdom | |
| 671720 | 5/1952 | United Kingdom | |
| 1591907 | 7/1981 | United Kingdom | 138/142 |
| 2242498 | 10/1991 | United Kingdom | 138/142 |

*Primary Examiner*—James E. Bryant, III
*Attorney, Agent, or Firm*—Robert W. Becker & Associates

[57]                 ABSTRACT

A multi-layer metal tube consists of a flat steel band having a soldering layer connected to at least one side of the steel band. The soldering layer consists of a copper alloy having a melting point below 1020°. The tube is produced by deforming the flat steel band into a tubular shape by winding or cylindrically rolling and by subsequently soldering the steel band to form the multi-layer metal tube. The soldering step prevents leaks as well as corrosion. In the corresponding method for manufacturing the multi-layer tubes the steel band in a first step is electrolytically degreased and activated in a nickel flash bath or in a copper pickling bath. Subsequently, the steel band is coated with the copper alloy which contains tin, zinc, or silver in order to reduce the melting point. After completion of the winding step or rolling step, the multi-layer tube can be coated with an additional corrosion-preventing layer.

6 Claims, 3 Drawing Sheets

STAINLESS STEEL STRIP PLATED WITH BRAZING ALLOY FOR MULTILAYER TUBE MANUFACTURING

BACKGROUND OF THE INVENTION

The present invention relates to a multi-layer metal tube, especially for brake lines of motor vehicles, that is made by winding or cylindrically rolling a flat steel band and subsequently soldering (brazing) with a soldering (brazing) layer provided at least on one side of the steel band.

The invention further relates to a method for manufacturing a multi-layer metal tube, especially for brake lines of motor vehicles, in which a steel band which is provided at least on one side with a soldering layer is wound or cylindrically rolled and subsequently soldered to form a pressure-tight tube by heating to a temperature above the melting temperature of the soldering layer.

Multi-layer metal tubes that are manufactured by winding or cylindrically rolling a flat steel band are especially employed in the automobile industry, especially for brake lines for motor vehicles. A further application of such tubes is their use in refrigeration machines.

From German publication 854 608 a multi-layer tube, manufactured from a flat steel band that is wound helically and subsequently soldered, is known in which as the binding metal between the steel layers that are laying atop one another a copper layer is used which has been applied prior to winding or rolling in a galvanic process. With this technique for manufacturing tubes, which has been used for a long time, problems have arisen from the beginning because such tubes have only an insufficient corrosion resistance. Therefore, these tubes, especially with respect to their use in brake lines of motor vehicles, have decisive disadvantages. This is so because brake lines are subjected to strong corrosive media, such as street dirt, moisture, and salt solutions. Furthermore, brake lines are subject to strong vibrations.

Multi-layer tubes have been substantially improved in the past by providing them with a zinc layer. Also, in the past years tubes have been additionally olive-chromized and coated with liquid plastic material.

As a further measure for improving such tubes it has been suggested to use steel bands made of stainless steel and especially austenitic chromium-nickel steels, as is, for example, described in German patent 40 10 178. The steel alloy suggested in this patent has a contents of 2 to 2.5% molybdenum and a contents of at most 2% manganese. The soldering material is a copper layer which is used in a special soldering method in which certain time and temperature limits must be precisely observed. In a first step, the tube is heated to a temperature of 1000° C., and in a further method step is slowly heated to the melting temperature of the copper soldering material. In a third method step, the metallurgical connection between the copper soldering material and the steel band takes place, whereby in this method step a time period of 20 seconds must not be exceeded. The observance of these precisely defined method parameters is necessary in order to prevent the risk of grain boundary diffusion of the soldering material which is an undesirable phenomenon that can occur during soldering. When such a diffusion occurs, soldering discontinuities may result leading to leaks in the tubes. The observance of the short heating period, however, is rather difficult because of the good heat conductivity of the tubes and the high manufacturing speeds of 100 to 200 m per minute. The grain boundary diffusion of copper further leads to a considerable reduction of the corrosion resistance of the tubes.

It is therefore an object of the present invention to provide a multi-layer metal tube, and especially a multi-layer metal tube for brake lines of motor vehicles, with which leaks and corrosion can be substantially reduced. Furthermore, a manufacturing method for such a multi-layer metal tube will be suggested.

BRIEF DESCRIPTION OF THE DRAWINGS

The object, and other objects and advantages of the present invention, will appear more clearly from the following specification in conjunction with the accompanying drawings, in which.

SUMMARY OF THE INVENTION

Figure 1:
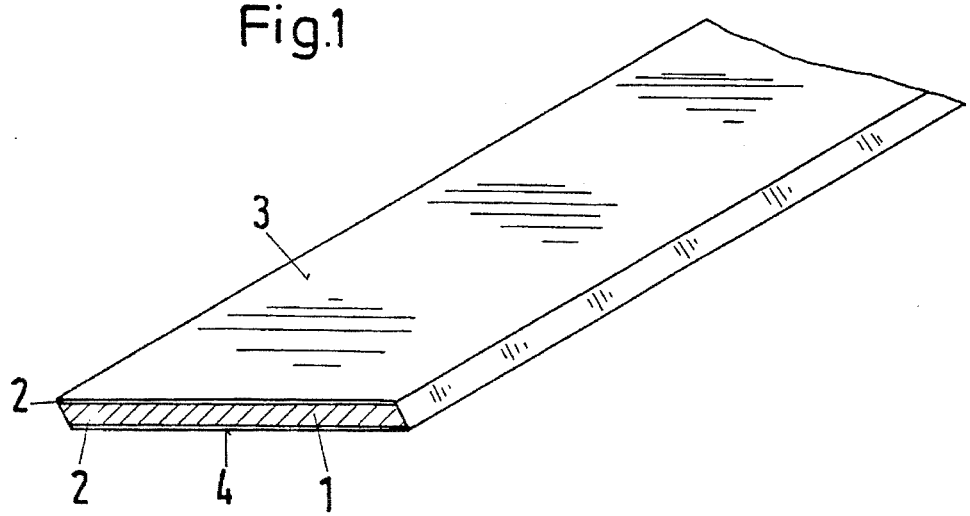
FIG. 1 is a perspective sectional view of a steel band for manufacturing a multi-layer tube in its initial state.

The multi-layer metal tube of the present invention is primarily characterized by a flat steel band having a soldering layer connected to at least one side of the steel band, wherein the soldering layer is comprised of a copper alloy having a melting point below 1020° C., and wherein the tube is produced by deforming the flat steel band into a tubular shape and by subsequently soldering the steel band to form the multi-layer metal tube.

Preferably, the melting point of the copper alloy is below 1000° C.

Such a multi-layer metal tube can be manufactured at temperatures that are lower than those employed for known multi-layer tubes so that the risk of grain boundary diffusion of the soldering material within the surface area of the steel band can be prevented. In this manner, no soldering discontinuities, resulting in leaks, are observed within the tubes. Furthermore, the corrosion resistance of the material is increased because, by preventing the inter-crystalline diffusion of copper into the steel, the risk of corrosion is reduced. In order to substantially reduce inter crystalline copper diffusion, it is sufficient to use a copper alloy that has a melting temperature below 1020° C. In this context, it is an additional advantage when a melting temperature of 1000° is not exceeded.

The multi-layer metal tube may be formed from the steel band by helically winding or by cylindrically rolling the steel band in order to form the metal tube.

Preferably, the copper alloy comprises 13 to 15% tin; the soldering temperature then is approximately 800° C. However, the copper alloy may also contain zinc whereby a content of 32.5 to 37% is desirable resulting in a soldering temperature of approximately 900° C. It is also possible to employ a copper alloy with 18% silver, resulting in a soldering temperature of approximately 1000° C.

Due to the prevention of the intercrystalline copper diffusion the resulting multi-layer tubes are corrosion-resistant in most media. However, even when using stainless steel as the steel band corrosion may occur under certain conditions. In a further embodiment of the multi-layer tube, it is thus suggested to provide the tube with an additional corrosion-preventing coating.

In a first embodiment of such a corrosion-preventing coating, it is suggested to employ a plastic material having dispersed therein chromized aluminum pigments.

In a further variant the corrosion-preventing coating is comprised of a zinc-aluminum layer.

The steel band is preferably comprised of alloyed stainless steel containing at least 2% manganese. It is furthermore suggested that the steel band be comprised of alloyed stainless steel containing at most 10.5% nickel.

The inventive method for manufacturing a multi-layer pressure-tight metal tube from a steel band is primarily characterized by the following steps:

Electrolytically degreasing the steel band;

Pretreating the steel band in an activating bath;

Coating the steel band with a copper alloy having a melting point below 1020° C.;

Deforming the flat steel band into a tubular shape;

Subsequently soldering by heating above the melting point of the copper alloy the tubular shape to form a pressure-tight tube; and Applying an aluminum-containing, corrosion-preventing coating to the pressure-tight tube. Preferably the melting point of the copper alloy is below 1000° C. The deforming step is preferably carried out by helically winding or, in the alternative, by cylindrically rolling the steel band.

Advantageously, the activating bath is a nickel flash bath or a copper pickling bath.

The coating step further comprises the step of galvanically coating the steel band in a zinc ion and copper ion containing cyanide bath. Alternatively, the coating step further comprises the step of galvanically coating the steel band in a tin ion and copper ion containing cyanide bath. In order to prevent droplet formation of the soldering material during the soldering step, it is suggested that the soldering layer, respectively, the layer of copper alloy, is applied with a thickness of 4 to 6 μm to the front of the steel band and applied with a thickness of 0.5 to 1.5 μm to the back of the steel band.

DESCRIPTION OF PREFERRED EMBODIMENTS

Figure 2:
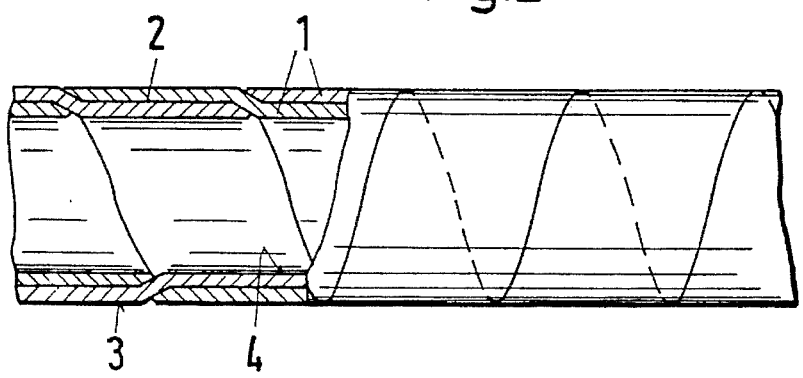
FIG. 2 is a partly sectioned representation of a multi-layer tube wound from a steel band.
Figure 3:
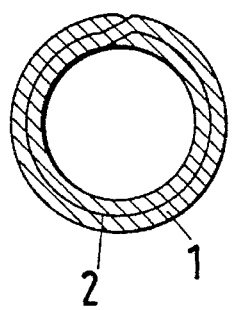
FIG. 3 is a cross-section of a multi-layer tube according to FIG. 2.

The present invention will now be described in detail with the aid of several specific embodiments utilizing FIGS. 1 through 3.

The multi-layer metal tube represented in the drawings is comprised of a steel band 1 which is shown in a developed projection in FIG. 1. The steel band 1 is rolled in a winding process such that at any location of the multi-layer tube a two-layer steel arrangement is provided, as can be seen in FIGS. 2 and 3. The pretreated steel band 1 according to FIG. 1 is coated on all sides with a soldering (brazing) layer 2 so that in the wound stage the soldering (brazing) material of the soldering (brazing) layer 2 is also provided between the individual layers of the steel band 1. By melting the soldering material after the winding step, a pressure-tight sealing of the multi-layer tube is achieved. It should be noted that the invention is also suitable for non-wound, but cylindrically rolled multi-layer tubes.

The steel band 1 is comprised of a stainless steel with a low contents of alloyed materials having a composition which will be explained in detail infra for certain embodiments. The soldering layer 2 is a thin copper alloy containing tin, zinc, or silver and has a maximal melting temperature of 1020° C. The thickness of the copper alloy on both sides of the steel band differs, whereby the upper side 3 of the steel band 1 in FIG. 1 is provided with a thickness of 0.5 to 1.5 μm which is substantially thinner than the coating on the underside 4 having a thickness of 4 to 6 μm. During the tube-forming step the thinner soldering layer 2 applied to the upper side 3 is positioned on the outside of the tube to be formed.

The represented multi-layer tube is primarily used for brake lines of motor vehicles. Further applications are, for example, pressure lines of refrigeration machines.

A decisive factor is that the melting temperature of the copper alloy to be used is below the melting temperature of pure copper of 1083° C. This is achieved by admixing alloy components such as tin, zinc, or silver. The soldering temperature used for manufacturing the multi-layer metal tube should be in the vicinity of the eutectic point or the eutectic line in order to achieve the greatest possible reliability for producing the soldering connection and prevent damage of the steel band by grain boundary diffusion of copper. The application of the copper layer onto the steel band before the winding step is performed either galvanically, by thermal spraying, or by vapor deposition. In order to achieve a good adhesion of the copper layer, an electrolytical degreasing step and activation in a nickel flash bath or in a special copper pickling bath are carried out before the galvanizing step. As a galvanizing bath a tin ion and copper ion containing cyanide bath or a zinc ion and copper ion containing cyanide bath is used.

Figure 3B:
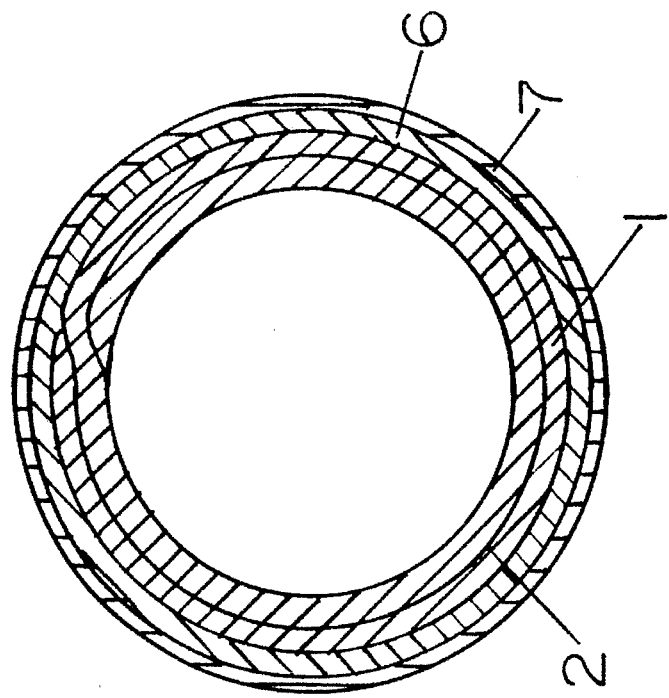
FIGS. 3a, 3b show protective layers applied to the tubes.
Figure 3A:
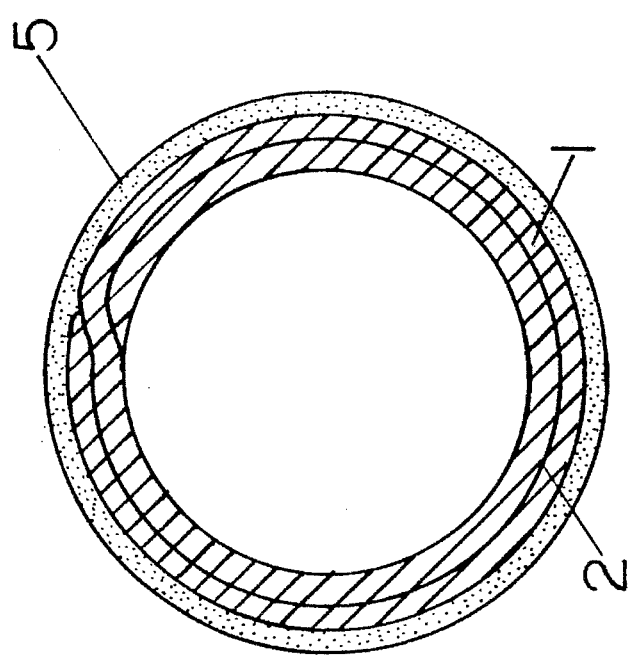
Figure 5:
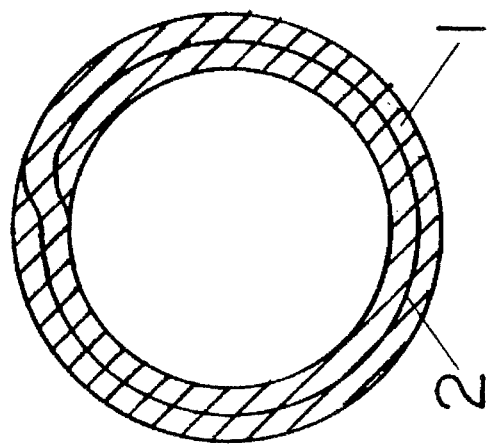
FIG. 5 is a cross-section of the tube of FIG. 4.
Figure 4:
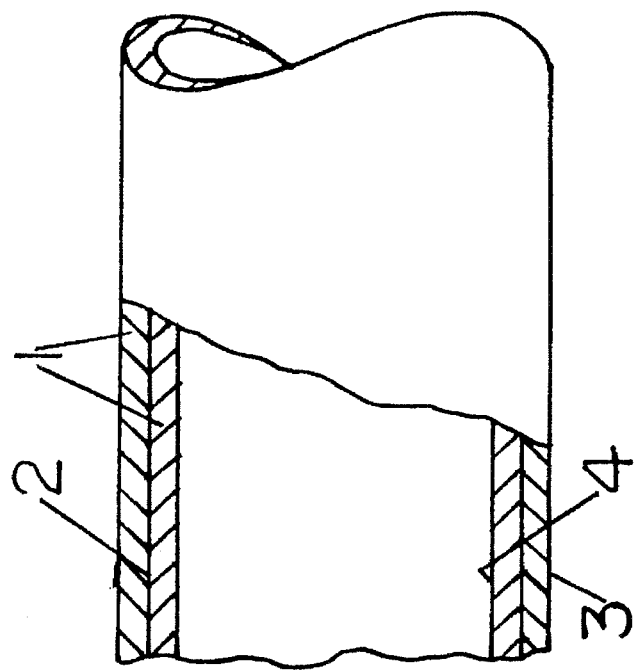
FIG. 4 is a partly sectioned view of a cylindrically rolled tube.

In order to additionally protect the multi-layer tube against corrosion, it is possible in a final method step to provide the tube with a plastic coating 5 that contains chromized aluminum pigments. Alternatively, it is possible to coat the tube in a final treatment step with a melt forming a zinc-aluminum layer 6 and, additionally with plastic material (layer 7 in FIG. 3b).

In the following three specific embodiments will be described.

EXAMPLE 1

The multi-layer tube is comprised of a stainless steel having the following composition:

6.5% manganese 0.5% silicon 16.5% chromium 4.5% nickel 0.1% carbon

Steel bands consisting of this material are pretreated in a galvanic apparatus after a respective electrolytical degreasing step and an activation step in a nickel flash bath or a special copper pickling bath such that a deposited bronze alloy subsequently exhibits excellent adhesion. A tin ion and copper ion containing cyanide bath of the following composition is used as the bronze bath:

Cu 17–23 g/l (in the form of potassium copper cyanide)

Sn 19–25 g/l (in the form of sodium stannate)

NaCN (free) 25–32 g/l

NaOH 10–14 g/l

Temperature 55°–58° C.

Current density 3.5–6.0 A/dm$^2$

Anodes bronze anodes 20% Sn or separate Cu and Sn anodes

The thickness of the applied copper alloy differs, i.e., it is applied with a thickness of approximately 4 μm to one side and approximately 1 μm to the other side. The alloy layer applied in the aforementioned manner is used in the subsequent soldering step as the melting soldering material for manufacturing the multi-layer tube. The soldering temperature is approximately 800° to 820° C. for a tin contents of 13 to 15% in the copper alloy. The soldering method is performed in a reducing gas atmosphere of up to 100% hydrogen contents.

The accordingly produced soldered tubes are then provided with a plastic coating 5 that contains chromized aluminum pigments. Finally, the multi-layer metal tubes are then heat-treated at approximately 140° to 160° C. in order to achieve a hardening of the remaining elasticity.

EXAMPLE 2

A stainless steel of the following composition is used for the steel band:

2.1% manganese 0.5% silicon 17.5% chromium 9.0% nickel 0.025% carbon

The steel bands comprised of this material are again pretreated in a Galvanic apparatus after a respective electrolytical degreasing step and an activation step in a nickel flash bath or in a special copper pickling bath such that a subsequently applied deposition of a brass alloy has excellent adhesion.

A zinc ion and copper ion containing cyanide bath of the following composition is used as the brass bath:

$CuCN$ 25–30 g/l $Zn(CN)_2$ 45–55 g/l $NaCN$ (free) 58–89 g/l $(NH_4)_2CO_3$ 7.5–10 g/l Temperature 50°–65° C.

Current density 4–7 A/dm$^2$

The thickness, as explained in example 1, varies also in this embodiment. The soldering temperature is just above 902° C. The copper alloy contains 32.5% to 37% zinc. Such an alloy is galvanotechnically easily produced, even when certain fluctuations during the galvanic deposition of the brass alloy must be taken into consideration. It is, however, advantageous that in the copper-zinc phase diagram a eutectic mixture exists that melts at 902° C.; therefore, the copper alloy melts at this temperature. Depending on the manner in which the heat is applied during soldering, it may be necessary that the temperature be slightly above this melting temperature. In order to prevent undesirable oxidation effects, the soldering step is performed in an inert hydrogen atmosphere of up to 100% hydrogen.

In a final treatment step, the multi-layered tubes manufactured in this manner are coated with a zinc-aluminum coating 6 and, additionally, with plastic material 7.

EXAMPLE 3

A stainless steel of the following composition is used:

2.1% manganese 0.5% silicon 17.0% chromium 10.5% nickel

2% molybdenum maximum 0.5% carbon

These steel bands are coated with a copper-silver alloy. The coating is applied in a galvanic process after respective pretreatment steps. Alternatively, the deposition may also be performed by a thermal spraying process.

This copper alloy contains approximately 18% silver and has a melting temperature of approximately 1000° C. The final treatment of these multi-layer tubes is performed according to the aforementioned methods in examples 1 and 2.

The present invention is, of course, in no way restricted to the specific disclosure of the specification and drawings, but also encompasses any modifications within the scope of the appended claims.

What we claim is:

1. A multi-layer metal tube comprised of:

a flat steel band having a brazing layer fixedly connected to at least one side of said steel band, wherein said brazing layer is comprised of a copper alloy;

said copper alloy consisting of, in addition to copper, one further metal selected from the group consisting of tin, zinc, and silver;

wherein tin is present in an amount of 13% to 15% and said copper alloy containing tin has a brazing temperature of 800° to 820° C., zinc is present in an amount of 32.5% to 37% and said copper alloy containing zinc has a brazing temperature of just above 902° C., and silver is present in an amount of 15% to 18% and said copper alloy containing silver has a brazing temperature below 1000° C.;

wherein said steel band is comprised of alloyed stainless steel containing at least 2% manganese, at most 10.5% nickel, and substantially an amount of chromium selected from 16.5%, 17.0%, and 17.5% chromium; and wherein said tube is produced by deforming said flat steel band into a tubular shape and by subsequently brazing said steel band to form said multi-layer metal tube.

2. A multi-layer metal tube according to claim 1, wherein said tube is formed by helically winding said steel band.

3. A multi-layer metal tube according to claim 1, wherein said tube is formed by cylindrically rolling said steel band.

4. A multi-layer metal tube according to claim 1, further comprising a corrosion-preventing coating.

5. A multi-layer metal tube according to claim 4, wherein said corrosion-preventing coating is comprised of a plastic material having dispersed therein chromized aluminum pigments.

6. A multi-layer metal tube according to claim 4, wherein said corrosion-preventing coating is comprised of a zinc-aluminum layer and a plastic material.

* * * * *